United States Patent [19]

Nakagawa

[11] Patent Number: 5,353,632

[45] Date of Patent: Oct. 11, 1994

[54] PROBE FOR ATOMIC FORCE MICROSCOPE USABLE FOR SCANNING TUNNELING MICROSCOPE

[75] Inventor: Tohru Nakagawa, Kusatsu, Japan

[73] Assignee: Matsushita Electric Industrial Co., Ltd., Osaka, Japan

[21] Appl. No.: 934,272

[22] Filed: Aug. 25, 1992

[30] Foreign Application Priority Data

Sep. 26, 1991 [JP] Japan ................... 3-247970

[51] Int. Cl.$^5$ .............................. H01J 37/26
[52] U.S. Cl. ..................................... 73/105
[58] Field of Search ............... 73/105; 250/306, 307, 250/423 F

[56] References Cited

U.S. PATENT DOCUMENTS 5,108,573 4/1992 Rubinstein et al. .
5,138,159 8/1992 Takase et al. ............. 250/307

FOREIGN PATENT DOCUMENTS

0383584A2 8/1990 European Pat. Off. .
0441311A2 8/1991 European Pat. Off. .
0498339A1 8/1992 European Pat. Off. .
0511662A1 11/1992 European Pat. Off. .

OTHER PUBLICATIONS

M. Pitsch et al., "Atomic Resolution with a New Atomic Force Tip*", vol. 175, No. 1, pp. 81–84 (Aug. 1989).
Patent Abstract of Japan, Publication No. JP2203260.
Patent Abstract of Japan, Publication No. JP62221103.
European Patent Search Report.

*Primary Examiner*—Robert Raevis
*Attorney, Agent, or Firm*—Fish & Richardson

[57] ABSTRACT

According to the invention, a probe for an atomic force microscope comprising a means for tunneling current is disclosed. The probe has a metal tip which is covered with a monomolecular film. The body of the probe is covered with a monomolecular laminated film, wherein conductive molecules are fixed on the the monomolecular film and/or the said monomolecular laminated film. The monomolecular laminated film has a crosslinked electroconductive surface. The monomolecular laminated film is fixed on the metal by a covalent bond comprising a siloxane base (—SiO—), and the laminated part of the molecule is also chemically fixed on the metal surface of a covalent bond comprising a siloxane base (—SiO—). The probe of this invention is durable and can be put to practical use, because the films are surface conductive rather than conductive through its thickness. Moreover, compared with a conventional probe, since this probe does not metal deposited on the surface, it has high reproductibility with less process step to manufacture the probe.

7 Claims, 7 Drawing Sheets probe body monomolecular laminated film $A = (CH_2)_2 (CF_2)_8 (CH_2)_2$ monomolecular film probe metal tip

PROBE FOR ATOMIC FORCE MICROSCOPE USABLE FOR SCANNING TUNNELING MICROSCOPE

FIELD OF THE INVENTION

The present invention relates to a probe which can be used as in an atomic force microscope and is adaptable to a scanning tunneling microscope by installing the probe on the scanning tunneling microscope.

BACKGROUND OF THE INVENTION

The present invention relates to a probe for use in an atomic force microscope which is used to scan the surface of a sample substrate. The probe has a sharp tip and scans at angstrom-level accuracy. At the same time, it can examine the shape of the sample surface by measuring the interaction, such as atomic force, which occurs between the probe and the sample surface (G. Binning et al. Phys. Rev. Lett. 56,930 (1986)).

The invention also relates to a method for measuring the atomic force which occurs between the probe and the sample substrate surface utilizing tunneling current. As in shown in FIG. 8, a known probe comprises a protrusion 150, a cantilever 151, and a cantilever support base 160. Metal 152 is deposited on the surface of the cantilever. Tunneling current 154, which occurs between a metal wire 153 with a sharp tip fixed on the probe and a metal film 152 on the surface of cantilever 151, can be measured by the probe's approaching the cantilever surface. If the interaction which occurs between the protrusion 150 and sample substrate 50 makes the cantilever bend, the distance between the metal wire and cantilever changes according to the degree of bend, and the values of the tunneling current varies as well (FIG. 9). According to the measurement of the tunneling current variation, it is apparent how much the cantilever is bent by measuring the tunneling current force, namely, how much atomic force is applied between the protrusion and the sample substrate.

However, in the system noted above, it is not only difficult to properly adjust the distance between the cantilever and the metal wire, but it also has a defect that is easily influenced by vibration. To solve these problems, Pitsch, among others, suggested the methods to measure atomic force as follows (M. Pitsch et al., Progr Colloid Polym Sci, 83,56 (1990)). The probe herein mentioned is defined as a probe for use in an atomic force microscope comprising a tunneling current measuring means.

As in shown FIG. 10, the surface of a known probe 200 having a tunneling current measuring means is covered with insulation 201, 202, and metal 203 is made deposited on the insulation 201, 202. The insulation 201 comprises polyvinylalcohol 201 and the other insulation comprises octadecyl-trichlorosilane (OTS) 202. The tip of the probe is of OTS only. The OTS film is 10 angstroms in thickness which allows the tunneling current to occur via OTS between the probe and the metal deposited on the probe. The conventional scanning tunneling microscope is designed to be able to measure the tunneling current between the sample substrate and the probe. Therefore, the scanning microscope can be utilized so as to detect the tunneling current which occurs between the probe and the deposited metal film. When a probe approaches the substrate surface, the organic film bends and the distance between the deposited film and the probe changes. Consequently, the flow of the tunneling current changes, which enables measurement of the atomic force between the sample substrate surface and the probe.

In the invention proposed by Pitsch, the adjustment of the probe is unnecessary and vibration does not give much influence upon the measurement. Additionally, Pitsch's invention enables shifting from a scanning tunneling electronic microscope to an atomic force microscope. However, the probe manufactured by Pitsch could not be put to practical use, because it had problems such as poor adherence between an organic film and metal film deposited on the probe which caused separation of deposited metal film during scanning on the sample substrate surface with the probe. Furthermore, since the manufacturing process of the probe was comprised of many different process, that invention could not provide high reproducibility in manufacturing the probe.

SUMMARY OF THE INVENTION

It is an primary object of this invention to provide a probe which obtains high durability and can be used in an atomic force microscope as a tunneling current measuring means. The manufacturing process is made simple by installing the probe on the microscope.

In order to accomplish the above object, this invention includes an atomic force microscope probe comprising a tunneling current measuring means having a probe body with a metal tip covered with monomolecular film, wherein the probe body is covered with a monomolecular laminated film, and conductive molecules are fixed on the surface of the monomolecular film and/or the monomolecular laminated film.

It is preferable in this invention that the monomolecular film and the monomolecular laminated film is fixed on the metal tip by a covalent bond comprising siloxane base (—SiO—), and the laminated film is chemically fixed on the metal surface by a covalent bond comprising siloxane (—SiO).

It is preferable in this invention that the metal tip is tungsten wire or platinum wire.

It is preferable in this invention that the monomolecular film and the monomolecular laminated film is formed as a chemically adsorbed film.

It is preferable in this invention that the monomolecular film and the monomolecular laminated film has a polymer side chain of high orientation at the molecular level.

It is preferable in this invention that the monomolecular film and the monomolecular laminated film has a crosslinked electroconductive surface.

It is preferable in this invention that the crosslinked electroconductive surface is polythiophene.

It is preferable in this invention that the monomolecular film and the monomolecular laminated film has a fluorocarbon group.

According to the said structure of this invention, since a conductive organic film covers the probe, and the organic molecules themselves comprising the film are conductive, metal deposited on the probe does not exfoliate due to the high durability. Furthermore, in the process of manufacturing a probe for an atomic force microscope comprising a tunneling measuring means, the steps needed in the process can be lessened because depositing metal on the probe is not necessary.

According to a preferred structure of this invention the monomolecular film and monomolecular laminated film is fixed on the metal surface by a covalent bond comprising a siloxane base (—SiO—), and the laminated part of the molecule is also fixed chemically by a covalent bond comprising a siloxane base (—SiO—). Since the film deposited on the metal tip does not exfoliate and the film surface can obtain conductivity as long as the covalent bond of the macromolecule is effective, this probe is durable and can be put to practical use.

The probe of this invention, has a metal tip which is covered with an organic thin film, especially the metal covered with the organic monomolecular or monomolecular laminated film is durable and can be put to practical use, because these organic thin films have the surface-wise conductivity but do not have the thickness-wise conductivity. Moreover, compared with a conventional probe, since this probe does not need to be deposited on the surface, it has high reproducibility with fewer steps for manufacturing the probe.

DETAILED DESCRIPTION OF THE INVENTION

Figure 1A:
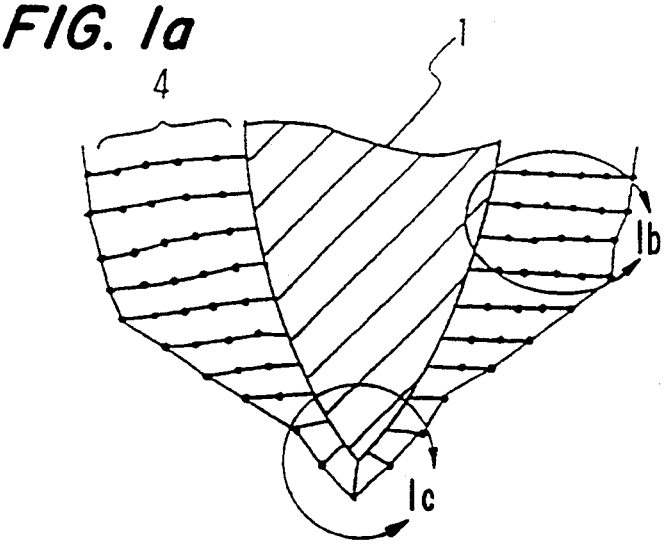
FIGS. 1a-1c are models which show a probe for an atomic force microscope for measuring tunneling current of this invention.

According to the invention, a monomolecular film or a monomolecular laminated film is formed as a siloxane-based monomolecular film comprising a fluorocarbon chain. The monomolecular film, has excellent character as a film, is a uniformly thin layer at the nanometer level and is also substantially pinhole-free. Further the monomolecular film is bonded to at least one surface of a substrate via siloxane bonds and is inseparable. The monomolecular film comprising a fluorocarbon chain is an excellent film, as it has water- and moisture proof properties by making use of the water-repelling property of fluorine.

According to the invention, a method of manufacturing a chemically adsorbed monomolecular film by a dehydrohalogenation reaction is brought about by contacting a substrate having hydrophilic groups at the surface with a non-aqueous organic solvent containing a compound having a halogen-based functional group able to react with the hydrophilic groups. A basic compound is present in the non-aqueous organic solvent.

The invention is suitably carried out by preparing a nonaqueous organic solvent containing molecules having functional groups able to react with hydrophilic groups; and dipping a substrate containing hydrophilic groups at the surface in the solvent.

The surface active material capable of use according to the invention contains a functional group able to chemically react with a hydrophilic group. Examples of the functional groups are chlorosilyl ($-SiCl_nX_{3-n}$) groups, chlorostannyl ($-TiCl_n X_{3-n}$) groups, chlorostannyl ($-SnCl_nX_{3-n}$) groups, where n represents 1, 2 or 3, X represents a hydrogen atom or a substituted group such as a lower-alkyl or lower-alkoxyl group, and other molecules containing active chlorine. The other end of the molecule may contain an organic group such as an alkyl, cycloalkyl or allyl group, for example a compound having a fluorocarbon group.

According to the invention, any substrate may be used which contains —OH, —COOH, —NH₂, =NH or other hydrophilic groups at its surface. Examples of these materials are various metals such as tungsten, platinum, aluminum, iron, stainless steel and titanium.

According to the invention, the substrate containing hydrophilic groups at the surface may be contacted with the nonaqueous organic solvent by any suitable means, e.g., dipping, spraying, brushing, blowing and spin coating.

It is preferred that the concentration of chemical adsorbing material solution is about $10^{-4}$ mol/l or above, more preferably $10^{-3}$ mol/l or above. The most preferred upper limit is $10^{-1}$ mol/l.

To form only a single chemically adsorbed monomolecular film according to the invention, it is necessary to carry out after the monomolecular film formation step a washing step, in which unreacted molecules remaining on the monomolecular film are washed away without water. As a method of washing, ultrasonic waves can be applied to a washing solution, or by continuous overflow of the washing solution, or by renewing the washing solution several times.

A method of manufacturing the laminated chemically adsorbed film comprises a chemical adsorption step of contacting a hydrophilic substrate with a non-aqueous solution containing a surface active material, having an adsorption site molecular group at one end and a reaction site molecular group at another end; a monomolecular layer formation step of washing non-adsorbed surface active material away from the hydrophilic substrate using a nonaqueous solution subsequent to the chemical adsorption step; and a reaction step of contacting the hydrophilic substrate after the monomolecular layer formation step with a solution containing molecules having a specific function to cause a reaction between the reaction site molecular group of the surface active material and the molecules having the specific function.

The chemical structure of a suitable surface active material is represented as

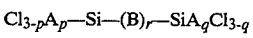

(where p and q represent an integer ranging from 0 to 2, r represents an integer (i,e., a natural number) ranging form 1 to 30, A represents a lower-alkyl group (e.g., methyl group, ethyl group, isopropyl group, etc.), or an alkoxy group (e,g., methoxy group, ethoxy group, propoxy group, etc, ), or an aryl group, and B represents a functional group selected from the group consisting of a chain segment (e.g., methylene chain, alkane chain, alkyne chain, etc.), an oxygen-containing chain compound segment having an oxygen-containing bond such as an ester group, a nitrogen-containing chain compound segment having a nitrogen-containing bond such as amino or imino group in the chain compound, a silicon-containing chain compound segment of an organic silicon compound, in which silicon is contained in the chain compound, an aromatic segment (e.g., phenylene, naphthylene, etc.), a substituted aromatic segment (e.g., phenyl-methylene, methyl-phenylene, phenylene sulfide, etc. ), a heterocyclic segment (e.g., pyrrole, thienyl, furan, carbazol, etc.), or a substituted heterocyclic segment (e.g., methylpyrrole, N-isopropylcarbazol, 3-methylenethienylene, etc.).

Where the surface active material has the above structure, the chemically adsorbed monomolecular layer in the functional laminated chemically adsorbed film according to the invention has a structure represented by the formula

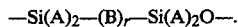

$$-Si(A)_2-(B)_r-Si(A)_2O-.$$

The surface active material according to the invention desirably has a chemical structure represented as formulas [1] to [6]:

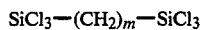

$$SiCl_3-(CH_2)_m-SiCl_3 \quad \text{[Formula 1]}$$

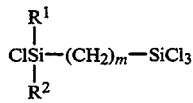

[Formula 2]

$$\begin{array}{c} R^1 \\ | \\ ClSi-(CH_2)_m-SiCl_3 \\ | \\ R^2 \end{array}$$

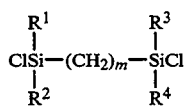

[Formula 3]

$$\begin{array}{c c} R^1 & R^3 \\ | & | \\ ClSi-(CH_2)_m-SiCl \\ | & | \\ R^2 & R^4 \end{array}$$

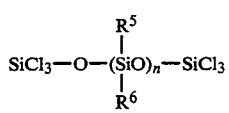

[Formula 4]

$$\begin{array}{c} R^5 \\ | \\ SiCl_3-O-(SiO)_n-SiCl_3 \\ | \\ R^6 \end{array}$$

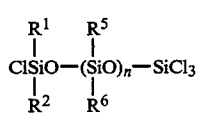

[Formula 5]

$$\begin{array}{c c} R^1 & R^5 \\ | & | \\ ClSiO-(SiO)_n-SiCl_3 \\ | & | \\ R^2 & R^6 \end{array}$$

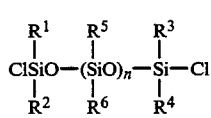

[Formula 6]

$$\begin{array}{c c c} R^1 & R^5 & R^3 \\ | & | & | \\ ClSiO-(SiO)_n-Si-Cl \\ | & | & | \\ R^2 & R^6 & R^4 \end{array}$$

(where $R^1$, $R^2$, $R^3$, $R^4$, $R^5$, $R^6$ represent a lower-alkyl group with a carbon number of 1 to 6 or lower-alkoxyl group or an aryl group, m and n are integers in a range from 1 to 30).

According to the invention, a laminated chemically adsorbed film may be manufactured by a method, which comprises a step of contacting a well-washed hydrophilic substrate with a non-aqueous solution containing a material having a plurality of chlorosilyl groups at opposite ends, such as the compound $Cl_{3-p}SiX_p-(D)_r-SiX_qCl_{3-q}$ (where p and q represents an integer ranging from 0 to 2, r represents an integer ranging from 1 to 30, and D represents a siloxane chain having a chloro atom). The method includes, dissolving a surface active material having reactive molecular groups at opposite ends of the material, in a non-aqueous solvent to form an adsorption solution, and contacting a substrate having surface active hydrogen groups with said adsorption solution to bring about a chemical adsorption reaction; washing non-reacted materials away from the substrate surface using a non-aqueous solution; reacting the chemically adsorbed surface active material with water to form an inner layer; reacting hydroxyl groups on the substrate surface with the chlorosilyl groups of the material containing chlorosilyl groups at its molecular ends to adsorb the material to the substrate surface; a subsequent step of washing excess material containing chlorosilyl groups away from the substrate using a non-aqueous organic solution and then dipping and holding the substrate in a non-aqueous solution containing a molecule having a specific function (e.g., derivatives of pyrrole, thiophene, aniline, furan, acetylene, diacetylene, etc. ) to react the chlorosilyl groups remaining on the surface with the molecules noted above, thereby securing the molecules to the substrate surface; and a subsequent step of removing excess molecules on the substrate surface by using a non-aqueous organic solution.

A method of manufacturing the laminated chemically adsorbed film comprises a chemical adsorption step of contacting a hydrophilic substrate with a non-aqueous solution containing a surface active material, having an adsorption site molecular group at one end and a reaction site molecular group at another end: a monomolecular layer formation step of washing non-adsorbed surface active material away from the hydrophilic substrate using a non-aqueous solution subsequent to the chemical adsorption step; and a reaction step of contacting the hydrophilic substrate after the monomolecular layer formation step with a solution containing molecules having a specific function to cause a reaction between the reaction site molecular group of the surface active material and the molecules having the specific function.

The non-aqueous solvent to be used according to the invention may be any organic solvent, which does not dissolve the plastic material with the chemically adsorbed film to be formed thereon and is free from active hydrogen able to react with the chlorosilane-based surface active material. Suitable examples of the solvent are fluorine-based solvents, e.g., 1,1-dichloro-1-fluoroethane, 1,1-dichloro-2,2,2-trifluoroethane, 1,1-dichloro-2,2,3,3,3-pentafluoropropane, 1,3-dichloro-1,1,2,2,3-heptafluoropropane, etc., hydrocarbon-based solvents, e.g., hexane, octane, hexadecane, cyclohexane, etc., ether-based solvents, e.g., dibutylether, dibenzylether, etc., and ester-based solvents, e.g.. methyl acetate, ethyl acetate, isopropyl acetate, amyl acetate, etc.

The description of an example in this invention is as follows.

Example 1

Tungsten wire with a diameter of 0.2 mm and a lengnth of 10 mm was prepared, which was sharpened by an electrolytic polishing method. The process of electrolytic polishing is as follows.

Figure 4:
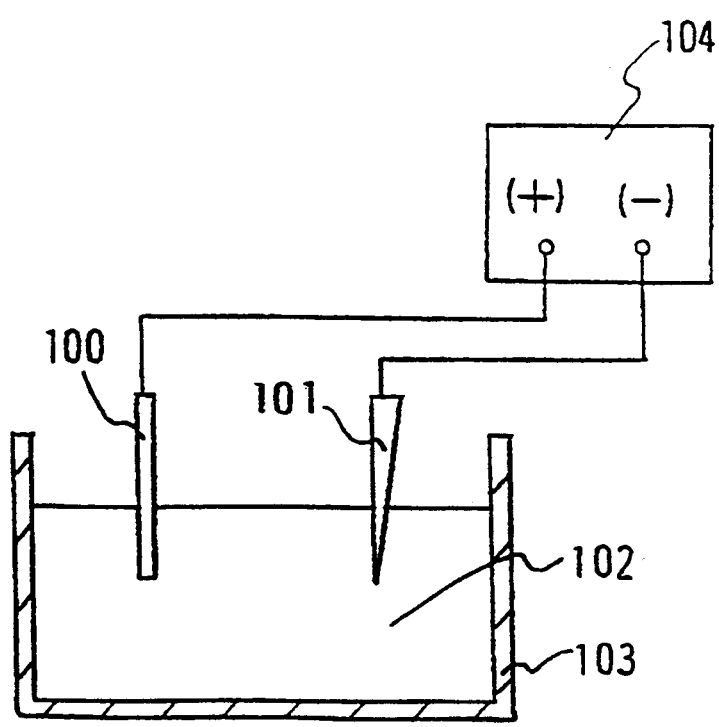
FIG. 4 shows a method for electrolytic etching of the tungsten wire of this invention.

As shown in FIG. 4, tungsten wire 100 and platinum wire 101 were dipped and held in a sodium nitrite solution (20 g/100 ml H$_2$O), and 30 V from a voltage generator 104 was applied between the tungsten wire and platinum wire with the tungsten wire as positive potential. About 1 mm of the tungsten from its end was inserted vertically in the above-mentioned solution. The voltage continued to be applied until bubbles did not rise from the tungsten wire and flashing stopped. After taking out the tungsten wire from the sodium nitrite solution, the tungsten wire was washed with demineralized water for five minutes, then with ethanol for five minutes.

The tungsten wire was dipped and held in a solution for one hour, which a silane coupling agent $Cl_3Si(CH_2)_2(CF_2)_6(CH_2)_2SiCl_3$, (thereafter "MOL27" is an abbreviation for this) was dissolved in an organic solvent. The organic solvent was made of 80 vol. % normal-hexadecane, 12 vol. % carbon tetrachloride and 8 vol. % chloroform). Accordingly, the first layer of the monomolecular film was formed. This layer was formed via dehydrochlorination reaction between —OH on the surface of the tungsten wire and —SiCl of the above mentioned MOL27. After that, the tungsten wire was washed with chloroform to remove the unreacted MOL27.

Next, the tungsten wire was washed with demineralized water to hydrolyze and to bridge chlorosilyl groups, except for the chlorosilyl groups (—SiCl) of the above mentioned MOL27 which reacted with —OH on the surface of the tungsten wire. The tungsten wire was dipped and held in the same way as above mentioned, and was repeated five times.

Figure 5:
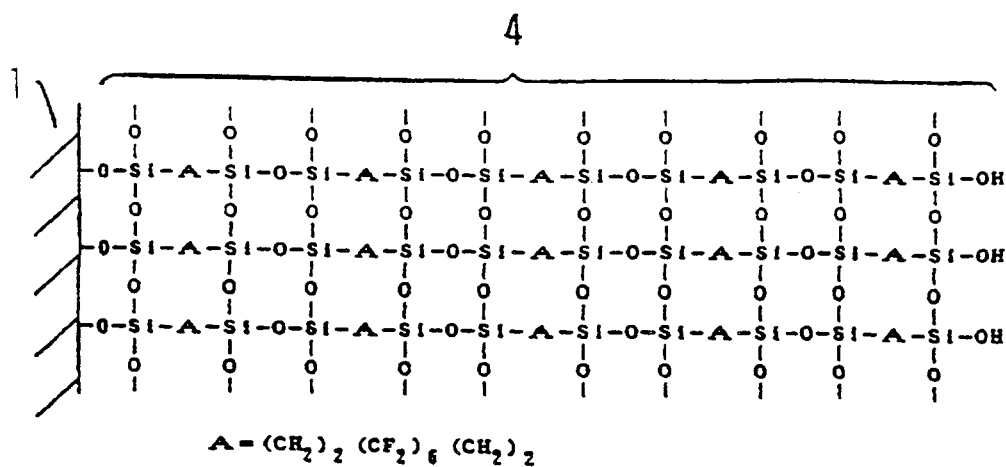
FIG. 5 is a model showing monomolecular film forming a laminated layer having five separate layers on the surface of the tungsten wire of this invention.
Figure 6:
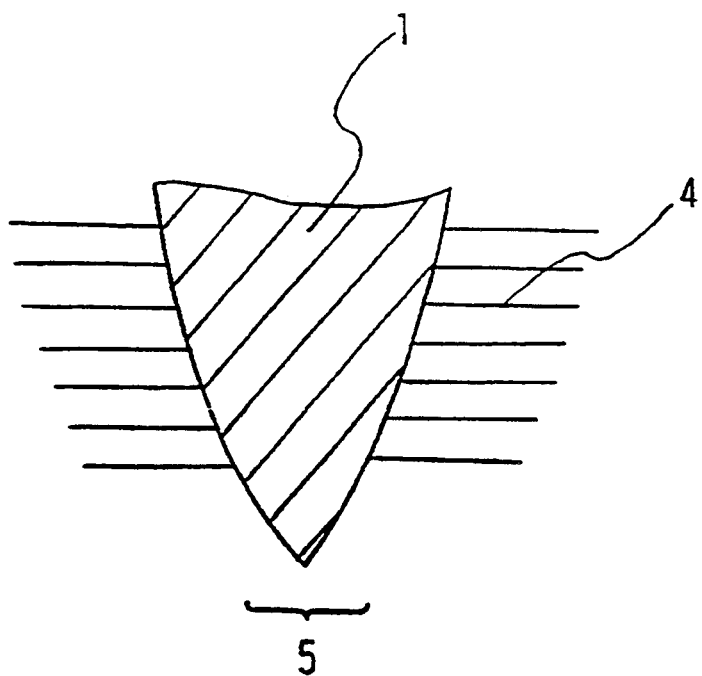
FIG. 6 is a model which shows the tungsten wire after processing with oxygen plasma.

Consequently, as shown in FIG. 5, the tungsten wire was laminated with the organic laminated thin film 4 and was comprised of five layers. This tungsten wire was covered with aluminum foil except for about 0.5 mm of the tip and was applied to an ashing treatment for 10 minutes in a oxygen plasma atmosphere at 110° C. Accordingly, only the tip 5 of the tungsten wire was removed from the reaction product reacted with MOL27 (the monomolecular laminated film 4) as in FIG. 6.

Figure 7:
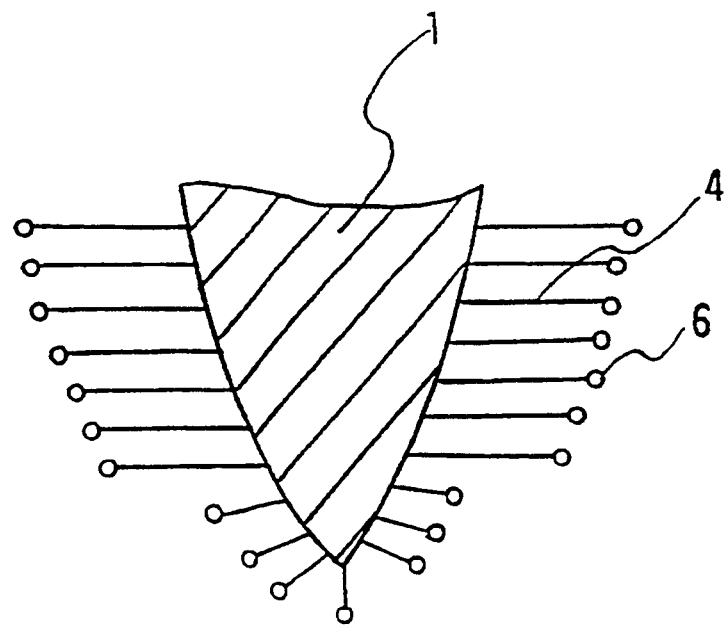
FIG. 7 is a model which shows tungsten wire after bonding together thiophene on the outermost layer of the monomolecular laminated film of this invention.
Figure 8:
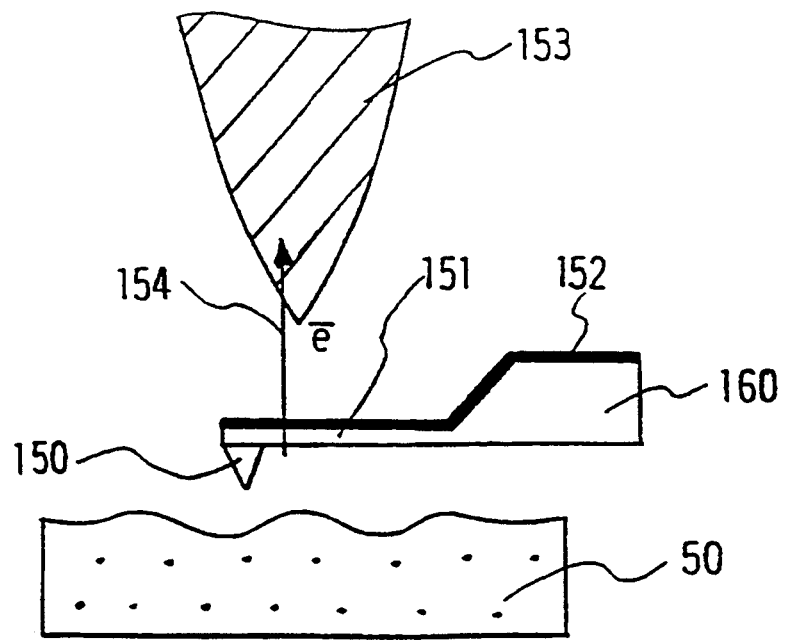
FIG. 8 shows a conventional method for measuring the atomic force by using tunneling current.
Figure 9:
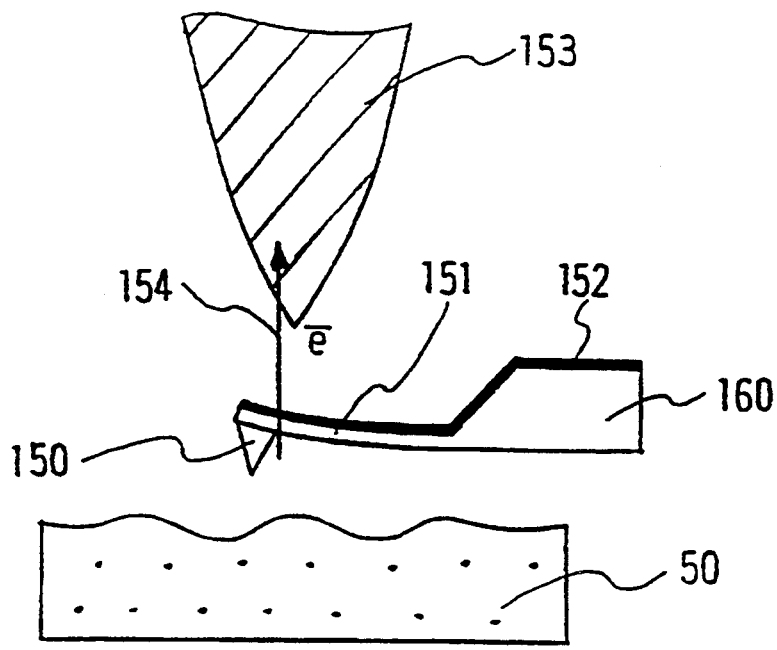
FIG. 9 shows a conventional method for measuring the atomic force by using tunneling current.
Figure 10:
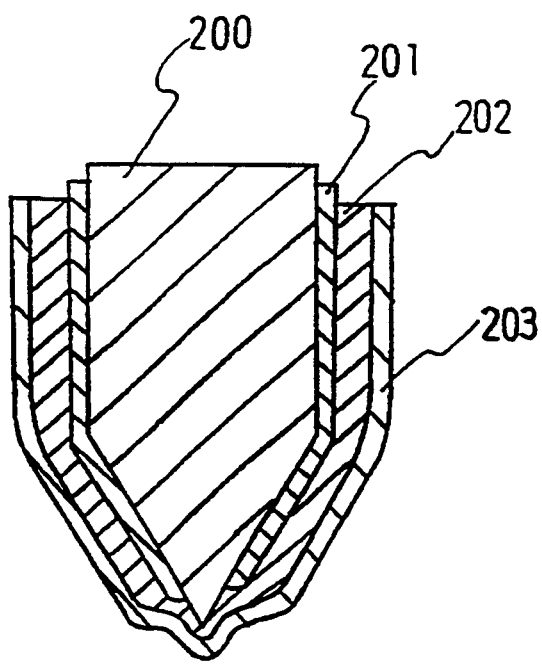
FIG. 10 is a model which shows a conventional probe of an atomic force microscope for measuring tunneling current.

Then, the tungsten wire 1 was dipped and held in the solution for eight hours which 30 mM of silane coupling agent with thiophene at one end as shown in Formula [7] was dissolved into a mixed solvent (80 vol. % normal-hexadecane, 12 vol. % carbon tetrachloride, 8 vol. % chloroform). The tungsten wire was then washed with a chloroform solution, followed by washing with demineralized water. As a result, the tungsten wire 1 was laminated with the organic thin film 4 thiophene at one end as shown in FIG. 7.

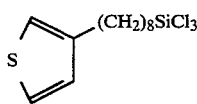 [Formula 7]

The polythiophene on the surface of the film was formed by electrolytic polymerization. The tungsten wire above mentioned was placed in the solution in which 0.1 M silver perchlorate was contained in an acetonitrile solvent with platinum as a counter electrode, and silver as a reference electrode. The above tungsten wire was polymerized by applying about 5 V for five minutes. The thiophene polymer obtained on the surface of the monomolecular laminated film was electrically conductive.

Figure 1B:
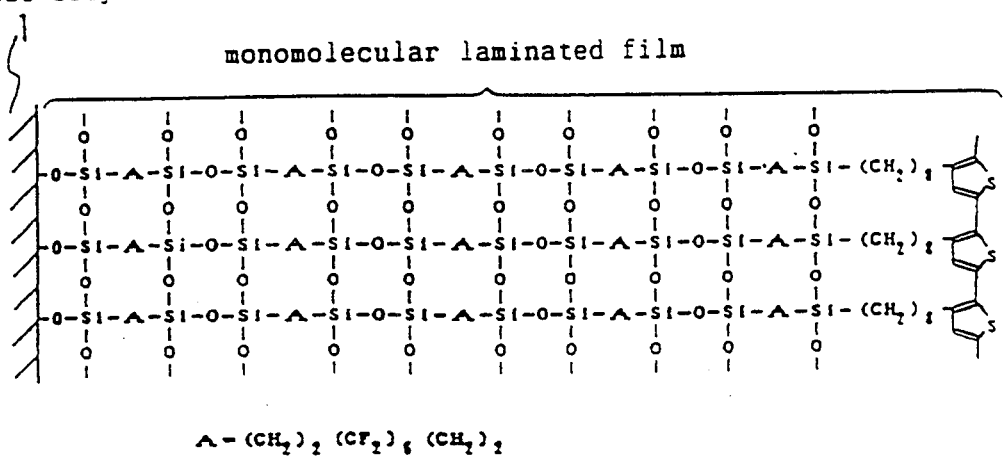
Figure 1C:
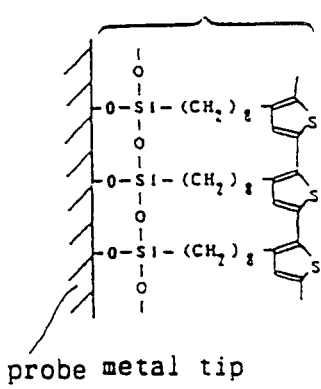

FIGS. 1a–1b are models which show a probe for an atomic force microscope comprising a tunnelling current measuring means. FIG. 1a shows a cross section of the probe. FIG. 1b is a model which shows an enlargement of the part 1(b) in FIG. 1a. The tungusten wire 1 is chemicallly adsorbed by bonds (—SiO—) to the first layer of the monomolecular film.

Figure 2:
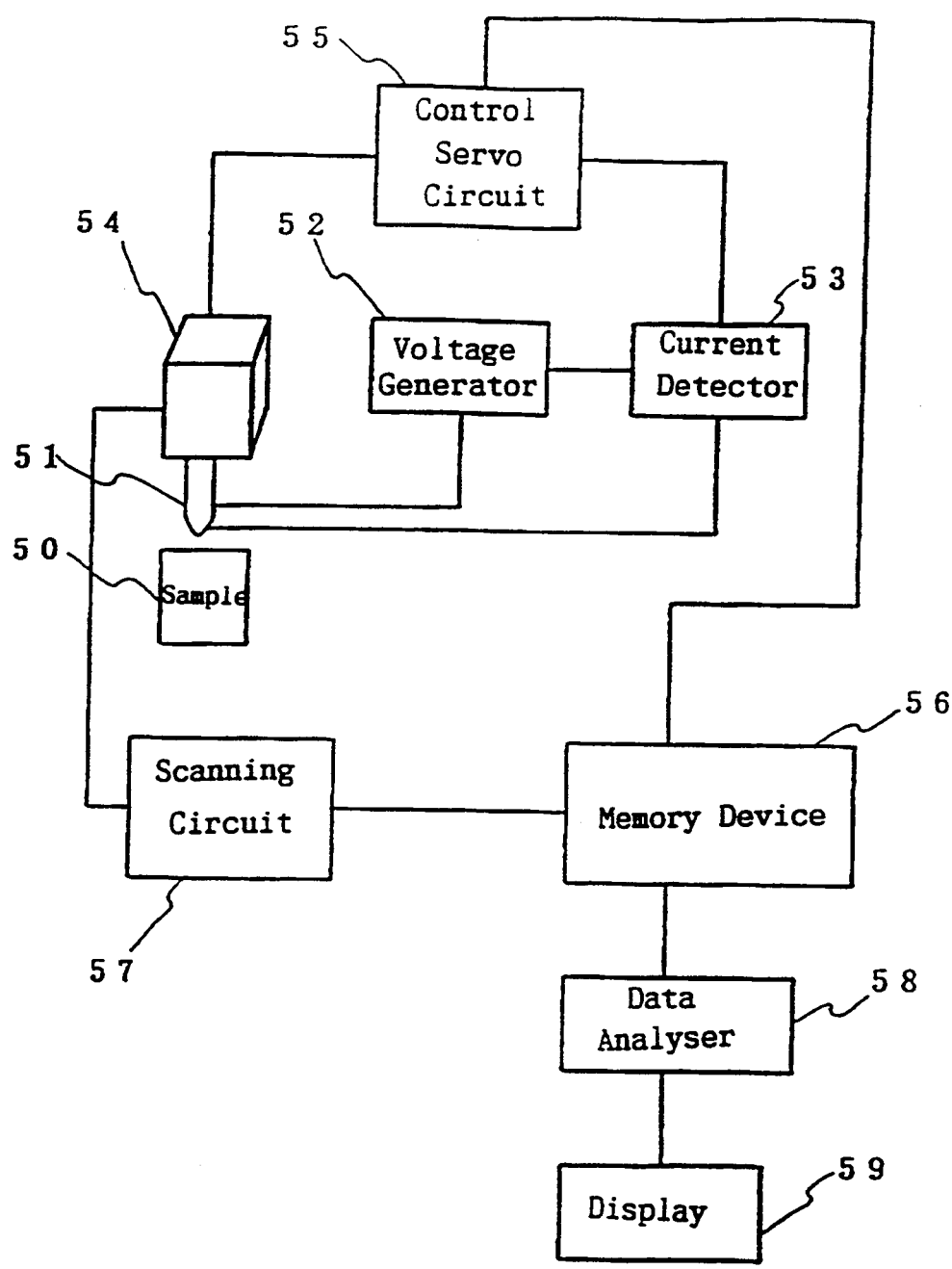
FIG. 2 shows the measurement system of a sample substrate by using the probe of this invention.

The surface of a mica substrate was detected by utilizing this probe. FIG. 2 shows the measurement system.

As shown in FIG. 2, 50 is a sample to be measured. 51 is a probe for an atomic force microscope for measuring tunneling current. 52 is a voltage generator to make the tunneling current move. 53 is a current detector. 54 is a piezoelectric scanner for scanning the sample at an atomic level of precision, which expands and contracts with an electric signal (a voltage) and can move in three dimentional directions. That is, in the Z axis direction for taking a sample up and down, in the Y axis direction for moving a sample back and forth, and in the X axis direction for transferring a sample right and left. 55 is a control servo circuit which controls Z axis direction of the sample. 56 is a memory device for the X,Y,Z axes directions which memorizes test results of the sample. 57 is a scanning circuit for the X,Y axes directions which controls a signal to scan the sample within an established scope. 58 is a data analyser. 59 is a display.

Figure 3:
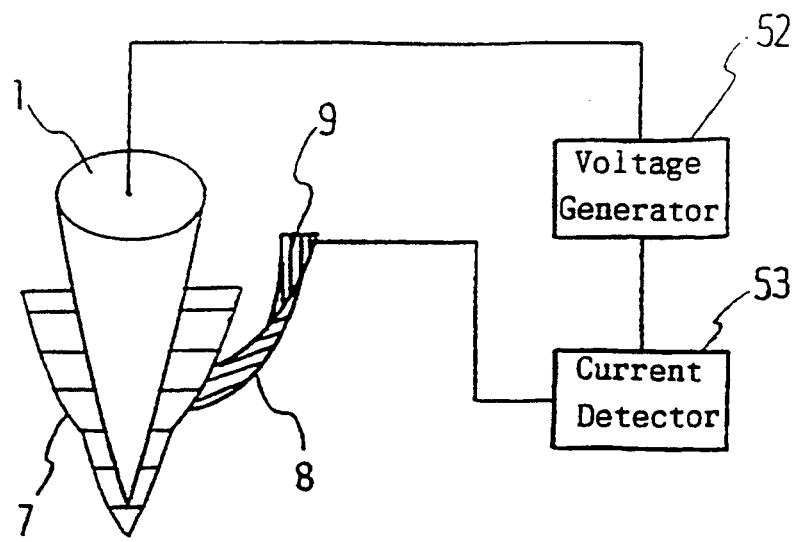
FIG. 3 is a detailed drawing which shows installation of the probe of this invention.

FIG. 3 is a detailed drawing which shows installation of a probe 51 in an atomic force microscope. That is, silver paste 8 conducts electric current between the film surface on the probe and the electrode in order to make the tunneling current move between the tungusten wire 1 and an organic thin film 7 covering the tungsten wire. The scanning microscope can be utilized so as to detect the tunneling current which occurs between the probe and the polythiophene portion. When a probe approaches the substrate surface, the monomolecular film bends and the distance between the polythiophene portion of the monomolecular film and the probe changes. Consequently, the flow of the tunneling current changes, which enables measurement of the atomic force between the sample substrate surface and the probe.

To measure the surface of mica, the surface was detected by scanning with the probe, while adjusting the distance between the probe and the mica so as to keep tunneling current flowing between the tungsten and polythiophene constant. The scanning range was set within a square at one side having 100 angstroms in length and several seconds was spent for scanning. As a result, the mica surface was observed at the atomic level, which was confirmed by utilizing a conventional atomic force microscope (e.g. ,NANOSCOPE manufactured by DIGITAL INSTRUMENT CORPORATION).

The observations which were conducted to several tens of micas by utilizing this probe held the same figures, demonstrating that the probe of this invention can be put to practical use.

Moreover, according to this invention, polythiophene, the conducting polymer, on the surface of the organic thin film can be easily polymerized by electrolytic polymerization and the manufacturing process is simple.

The example of this invention designated polythiophene as an organic thin film covering the tungsten wire, however, other materials are available: e.g., conducting polymer materials including polypyrrole and polyaniline, or organic molecules which are not high polymers, but have the surface conductivity.

According to an example of this invention, since the organic thin film covering the metal wire was made of a silane coupling agent, which means that this organic thin film is covalently bonded to the metal tip and the surface of the film is comprised of covalently bonded high-molecular substances, the film does not exfoliate from the metal tip. Since the conductivity is maintained on the surface of the film as far as the high-molecular substances on the film maintain the covalent bonds, this probe is durable and can be put to practical use.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A probe for an atomic force microscope comprising a tunneling current measuring means having a probe body having a metal tip covered with a monomolecular film, wherein the probe body is covered with a monomolecular laminated film and conductive molecules are fixed on the monomolecular film and/or the monomolecular laminated film, and wherein the monomolecular film is fixed on the metal tip by covalent bonds comprising siloxane (—SiO—) groups, and the monomolecular laminated film is chemically fixed on the metal tip by covalent bonds comprising siloxane (—SiO—) groups.

2. The probe according to claim 1, wherein said metal tip is tungsten wire or platinum wire.

3. The probe according to claim 1, wherein said monomolecular laminated film is formed as a chemically adsorbed film.

4. The probe according to claim 1, wherein said monomolecular laminated film has a polymer side chain of high orientation at the molecular level.

5. The probe according to claim 1, wherein said monomolecular film and said monomolecular laminated film has a crosslinked electroconductive surface.

6. The probe according to claim 5, wherein said monomolecular film and said crosslinked electroconductive surface is polythiophene.

7. The probe according to claim 1, wherein said monomolecular film and said monomolecular laminated film has a fluorocarbon group.

* * * * *